United States Patent
Sugiura et al.

(10) Patent No.: US 8,534,093 B2
(45) Date of Patent: Sep. 17, 2013

(54) UNIT FOR EJECTOR-TYPE REFRIGERATION CYCLE, AND REFRIGERATION CYCLE DEVICE USING THE SAME

(75) Inventors: Takayuki Sugiura, Anjo (JP); Hirotsugu Takeuchi, Nagoya (JP)

(73) Assignee: Denso Corporation, Kariya (JP)

( * ) Notice: Subject to any disclaimer, the term of this patent is extended or adjusted under 35 U.S.C. 154(b) by 584 days.

(21) Appl. No.: 12/523,224

(22) PCT Filed: Feb. 26, 2008

(86) PCT No.: PCT/JP2008/053254
§ 371 (c)(1),
(2), (4) Date: Jul. 15, 2009

(87) PCT Pub. No.: WO2008/105391
PCT Pub. Date: Sep. 4, 2008

(65) Prior Publication Data
US 2010/0132400 A1    Jun. 3, 2010

(30) Foreign Application Priority Data
Feb. 27, 2007    (JP) .................................. 2007-46630

(51) Int. Cl.
| | |
|---|---|
| *F25B 21/02* | (2006.01) |
| *F25B 13/00* | (2006.01) |
| *F25B 1/06* | (2006.01) |
| *B60H 1/32* | (2006.01) |
| *F25J 3/00* | (2006.01) |
| *F16L 39/00* | (2006.01) |
| *F16L 39/04* | (2006.01) |
| *F16L 27/00* | (2006.01) |
| *F16L 41/00* | (2006.01) |

(52) U.S. Cl.
USPC .................. 62/500; 62/3.2; 62/3.61; 62/324; 62/239; 62/619; 62/638; 62/199; 285/133.11; 285/122.1; 285/179; 285/120; 285/120.1; 285/125.11; 285/129.1

(58) Field of Classification Search
USPC ................... 62/3.2, 3.61, 324, 239, 619, 638, 62/500, 199; 138/285; 285/133.11, 122.1, 285/179, 120, 120.1, 125.1, 129.1, 133.1, 285/132.1; 165/139, 123, 108
See application file for complete search history.

(56) References Cited

U.S. PATENT DOCUMENTS

| | | | | |
|---|---|---|---|---|
| 2,121,558 A | * | 6/1938 | Coe et al. ................... | 29/890.15 |
| 7,694,528 B2 | * | 4/2010 | Nishida et al. .................. | 62/500 |

(Continued)

FOREIGN PATENT DOCUMENTS

| | | |
|---|---|---|
| EP | 1870648 A1 | 12/2007 |
| JP | S57-73564 U | 5/1982 |

(Continued)

OTHER PUBLICATIONS

JP 2006292351, Unezaki et al, Oct. 26, 2006, machine translation.*

(Continued)

*Primary Examiner* — Frantz Jules
*Assistant Examiner* — Erik Mendoza-Wilkenfel
(74) *Attorney, Agent, or Firm* — Harness, Dickey & Pierce, PLC (57) ABSTRACT

A unit for an ejector-type refrigeration cycle includes an ejector, first and second evaporators connected in parallel to a downstream side of the ejector and configured to evaporate the refrigerant discharged from the outlet of the ejector, and a refrigerant distributor configured to distribute the refrigerant discharged from an outlet of the ejector to a side of the first evaporator and a side of the second evaporator. The ejector draws refrigerant from a refrigerant suction port by a high-velocity refrigerant flow jetted from a nozzle portion, and mixes the refrigerant injected from the nozzle portion with the refrigerant drawn from the refrigerant suction port so as to discharge the mixed refrigerant from the outlet of the ejector. The ejector and the refrigerant distributor are connected to each other such that the refrigerant discharged from the outlet of the ejector directly flows into the refrigerant distributor.

9 Claims, 5 Drawing Sheets

(56) References Cited

U.S. PATENT DOCUMENTS

| | | | |
|---|---|---|---|
| 2006/0218964 A1* | 10/2006 | Saito et al. | 62/500 |
| 2006/0254308 A1 | 11/2006 | Yokoyama et al. | |
| 2007/0169511 A1* | 7/2007 | Ishizaka et al. | 62/500 |
| 2008/0098757 A1* | 5/2008 | Takeuchi et al. | 62/217 |
| 2008/0264097 A1 | 10/2008 | Ishizaka et al. | |

FOREIGN PATENT DOCUMENTS

| | | | |
|---|---|---|---|
| JP | S57-73566 U | | 5/1982 |
| JP | H3-291465 A | | 12/1991 |
| JP | H6-137695 A | | 5/1994 |
| JP | 2000-283577 A | | 10/2000 |
| JP | 2004-003804 A | | 1/2004 |
| JP | 2005-308384 A | | 11/2005 |
| JP | 2006-118726 | | 5/2006 |
| JP | 2006-292347 | | 10/2006 |
| JP | 2006-292351 A | | 10/2006 |
| JP | 2006292351 A | * | 10/2006 |
| JP | 2006-317116 | | 11/2006 |
| JP | 2007-057222 A | | 3/2007 |
| JP | 2008-107055 A | | 5/2008 |

OTHER PUBLICATIONS

Office action dated Jan. 5, 2011 in corresponding Japanese Application No. 2007-46630.

Office action dated Oct. 4, 2011 in corresponding Japanese Application No. 2007-46630.

International Search Report and Written Opinion for PCT/JP2008/053254, mailed May 27, 2008.

Office action dated Jun. 10, 2010 in corresponding Chinese Application No. 2008-80006256.6.

* cited by examiner

UNIT FOR EJECTOR-TYPE REFRIGERATION CYCLE, AND REFRIGERATION CYCLE DEVICE USING THE SAME

CROSS-REFERENCE TO RELATED APPLICATIONS

This application is a 371 U.S. National Stage of International Application No. PCT/JP2008/053254, filed Feb. 26, 2008. This application claims priority to Japanese Patent Application No. JP2007-46630, filed Feb. 27, 2007. The disclosures of the above applications are incorporated herein by reference.

TECHNICAL FIELD

The present invention relates to a unit for an ejector-type refrigeration cycle including an ejector, and a refrigeration cycle device using the same. The refrigeration cycle device is suitable for use in an air conditioner for a vehicle.

BACKGROUND ART

Conventionally, an ejector-type refrigeration cycle including an ejector is disclosed in Patent Document 1. The ejector-type refrigeration cycle disclosed in Patent Document 1 includes a first evaporator disposed on the downstream side of the ejector, and a gas/liquid separator disposed on the downstream side of the first evaporator to separate refrigerant into gas and liquid phases. The gas-phase refrigerant separated in the gas/liquid separator is drawn into a compressor.

On the other hand, the liquid-phase refrigerant separated in the gas/liquid separator flows into a second evaporator, and the refrigerant flowing out of the second evaporator flows into a refrigerant suction port of the ejector.

In the ejector-type refrigeration cycle disclosed in Patent Document 1, the first evaporator is integrated with the second evaporator, and the ejector is disposed outside of the integrated first and second evaporators, so that the first and second evaporators and the ejector are connected together by refrigerant piping.

Patent Document 1: JP 6-137695 A

DISCLOSURE OF THE INVENTION

In the ejector-type refrigeration cycle disclosed in Patent Document 1, the liquid-phase refrigerant separated at the gas/liquid separator is allowed to flow into the second evaporator, thereby leading to a loss in kinetic energy of the refrigerant in separating the refrigerant into the gas and liquid phases by the separator. Therefore, the dynamic pressure of the liquid-phase refrigerant separated is almost lost. Thus, the flow of refrigerant flowing into the second evaporator is weakened, and the second evaporator cannot disadvantageously exhibit a sufficiently refrigeration capacity.

Thus, the inventors of the present application have previously proposed an ejector-type refrigeration cycle including a second evaporator having improved refrigeration capacity in Japanese Patent Application No. 2006-292347 (hereinafter referred to as a previous application example).

In the previous application example, a refrigerant distributor for distributing the refrigerant flowing from an ejector into first and second evaporators is disposed on the downstream side of the ejector. The first evaporator is disposed between the refrigerant distributor and a compressor, and the second evaporator is disposed between the refrigerant distributor and a refrigerant suction port of the ejector.

In the previous application example, the dynamic pressure of the refrigerant flowing from the ejector can be used to allow the refrigerant to flow into the second evaporator, thereby improving the refrigeration capacity of the second evaporator.

In the previous application example, however, the refrigerant distributor needs to be connected to the ejector by refrigerant piping, and further to the first and second evaporators by other refrigerant piping, thereby resulting in a complicated structure of the refrigerant piping, and further resulting in a complicated structure of the ejector-type refrigeration cycle.

In particular, when the ejector-type refrigeration cycle is applied to an air conditioner for a vehicle, the mounting space of the ejector-type refrigeration cycle is restricted in the vehicle, and thereby the complicated structure of the ejector-type refrigeration cycle poses a large problem associated with mounting of the cycle.

In view of the foregoing problems, it is an object of the present invention to provide a unit for an ejector-type refrigeration cycle that can simplify the structure of a refrigeration cycle device.

It is another object of the present invention to provide a refrigeration cycle device including an ejector, which can improve refrigeration capacities of first and second evaporators, while simplifying the structure of the refrigeration cycle device.

To achieve the above objects of the present invention, a unit for an ejector-type refrigeration cycle includes: an ejector (13) for drawing refrigerant from a refrigerant suction port (13b) by a high-velocity refrigerant flow jetted from a nozzle portion (13a) configured to decompress and expand the refrigerant, and for mixing the refrigerant injected from the nozzle portion (13a) with the refrigerant drawn from the refrigerant suction port (13b) so as to discharge the mixed refrigerant from an outlet (13e) of the ejector (13); a first evaporator (15) and a second evaporator (16) connected in parallel to a downstream side of the outlet (13e) of the ejector (13), and configured to evaporate the refrigerant discharged from the outlet (13e) of the ejector (13); and a refrigerant distributor (14, 33 to 36) configured to distribute the refrigerant discharged from the outlet (13e) of the ejector (13) to a side of the first evaporator (15) and a side of the second evaporator (16). The ejector (13) and the refrigerant distributor (14, 33 to 36) are connected to each other such that the refrigerant discharged from the outlet (13e) of the ejector (13) directly flows into the refrigerant distributor (14, 33 to 36).

Because the ejector (13) and the refrigerant distributor (14, 33 to 36) are connected to each other such that the refrigerant discharged from the outlet (13e) of the ejector (13) directly flows into the refrigerant distributors (14, 33 to 36), it is unnecessary to connect the ejector (13) with the refrigerant distributor (14, 33 to 36) via refrigerant piping. Accordingly, the structure of the ejector-type refrigeration cycle can be simplified.

For example, the refrigerant distributor (14) includes a first linear pipe-shaped portion (14a) for allowing the refrigerant discharged from the outlet (13e) of the ejector (13) to directly flow thereinto while allowing the refrigerant to flow toward the second evaporator (16), and a second pipe-shaped portion (14b) for allowing the refrigerant to flow toward the first evaporator (15). The second pipe-shaped portion (14b) protrudes from an outer peripheral surface of an end portion of the first pipe-shaped portion (14a) on an upstream side of the refrigerant flow in the direction perpendicular to the first pipe-shaped portion (14a).

Accordingly, the refrigerant can flow toward the second evaporator (16) by using dynamic pressure of the refrigerant flowing out of the ejector, and thereby the refrigeration capacity of the second evaporator (16) can be improved.

The term "in the direction perpendicular to" as used herein means not only the direction strictly perpendicular to, but also the direction approximately perpendicular to.

Alternatively, the refrigerant distributor (33) includes a first pipe-shaped portion (33a) for allowing the refrigerant discharged from the outlet (13e) of the ejector (13) to directly flow thereinto while allowing the refrigerant to flow toward the second evaporator (16), and a second pipe-shaped portion (33b) for allowing the refrigerant to flow toward the first evaporator (15). The first pipe-shaped portion (33a) may have such a shape that an end portion thereof on a downstream side of the refrigerant flow is bent at a right angle, and the second pipe-shaped portion (33b) may protrude from an outer peripheral surface of an end portion of the first pipe-shaped portion (33a) on the upstream side of the refrigerant flow in a direction opposite to a bending direction of the end portion on downstream side of the refrigerant flow.

The term "being bent at a right angle" as used herein means being bent not only strictly at a right angle, but also approximately at a right angle. The term "protruding in the direction opposite to" as used herein means protruding not only strictly in the direction opposite to, but also approximately in the direction opposite to.

Alternatively, the refrigerant distributor (34) may include a first pipe-shaped portion (34a) for allowing the refrigerant discharged from the outlet portion (13e) of the ejector (13) to directly flow thereinto while allowing the refrigerant to flow toward the second evaporator (16), and a second pipe-shaped portion (34b) for allowing the refrigerant to flow toward the first evaporator (15). The first pipe-shaped portion (34a) may have such a shape that an end portion thereof on a downstream side of the refrigerant flow is bent at a right angle, and the second pipe-shaped portion (34b) may protrude from an outer peripheral surface of a middle part in the refrigerant flow direction of the first pipe-shaped portion (34a) in a direction opposite to a bending direction of the end portion on downstream side of the refrigerant flow.

The term "being bent at a right angle" as used herein means being bent not only strictly at a right angle, but also approximately at a right angle. The term "protruding in the direction opposite to" as used herein means protruding not only strictly in the direction opposite to, but also approximately in the direction opposite to.

Alternatively, the refrigerant distributor (35) has a T-like shape that includes a first linear pipe-shaped portion (35a) for allowing the refrigerant discharged from the outlet (13e) of the ejector (13) to directly flow thereinto, and a second linear pipe-shaped portion (35b) connected to an end portion of the first pipe-shaped portion (35a) for allowing the refrigerant to flow toward the first evaporator (15) and the second evaporator (16).

Accordingly, the refrigerant can flow into not only the second evaporator (16) but also the first evaporator (15) by using the dynamic pressure of the refrigerant flowing out of the ejector (13), and thereby the refrigeration capacity of the first evaporator (15) can be improved.

The term "the T-like shape" as used herein means not only strictly the T shape, but also approximately T shape.

Alternatively, the refrigerant distributor (36) includes a first linear pipe-shaped portion (36a) for allowing the refrigerant discharged from the outlet (13e) of the ejector (13) to directly flow thereinto, a second linear pipe-shaped portion (36b) for allowing the refrigerant to flow out toward the first evaporator (15), and a third linear pipe-shaped portion (36c) for allowing the refrigerant to flow out toward the second evaporator (16). The second pipe-shaped portion (36b) and the third pipe-shaped portion (36c) may be connected to an end of the first pipe-shaped portion (36a), and may be arranged substantially in parallel to the first pipe-shaped portion (36a).

The term "being arranged in parallel" as used herein means "being arranged not only strictly in parallel, but also arranged approximately in parallel".

Furthermore, the refrigerant distributor (14, 33 to 36) and the first evaporator (15) may be connected to each other such that the refrigerant flowing from the refrigerant distributor (14, 33 to 36) toward the first evaporator (15) directly flows into the first evaporator (15).

Accordingly, it is unnecessary to connect the refrigerant distributor (14, 33 to 36) and the first evaporator (15) by using refrigerant piping, and thereby the structure of the ejector-type refrigeration cycle can be made simple.

The refrigerant distributor (14, 33 to 36) and the second evaporator (16) may be connected to each other such that the refrigerant flowing from the refrigerant distributor (14, 33 to 36) toward the second evaporator (16) directly flows into the second evaporator (16).

Accordingly, it is unnecessary to connect the refrigerant distributor (14, 33 to 36) and the second evaporator (16) by using refrigerant piping, and thereby the structure of the ejector-type refrigeration cycle can be made simple.

Furthermore, the unit for the ejector-type refrigeration cycle may be used for a refrigeration cycle device. In this case, the refrigeration cycle device may include a compressor (11) configured to draw and compress refrigerant, a radiator (12) configured to radiate heat from the high-pressure refrigerant discharged from the compressor (11), and the unit for the ejector-type refrigeration cycle configured to decompress and evaporate the refrigerant supplied from the radiator (12).

Accordingly, the refrigeration cycle device having the above functions and effects according to the present invention can be configured.

BEST MODE FOR CARRYING OUT THE INVENTION (First Embodiment)

Figure 1:
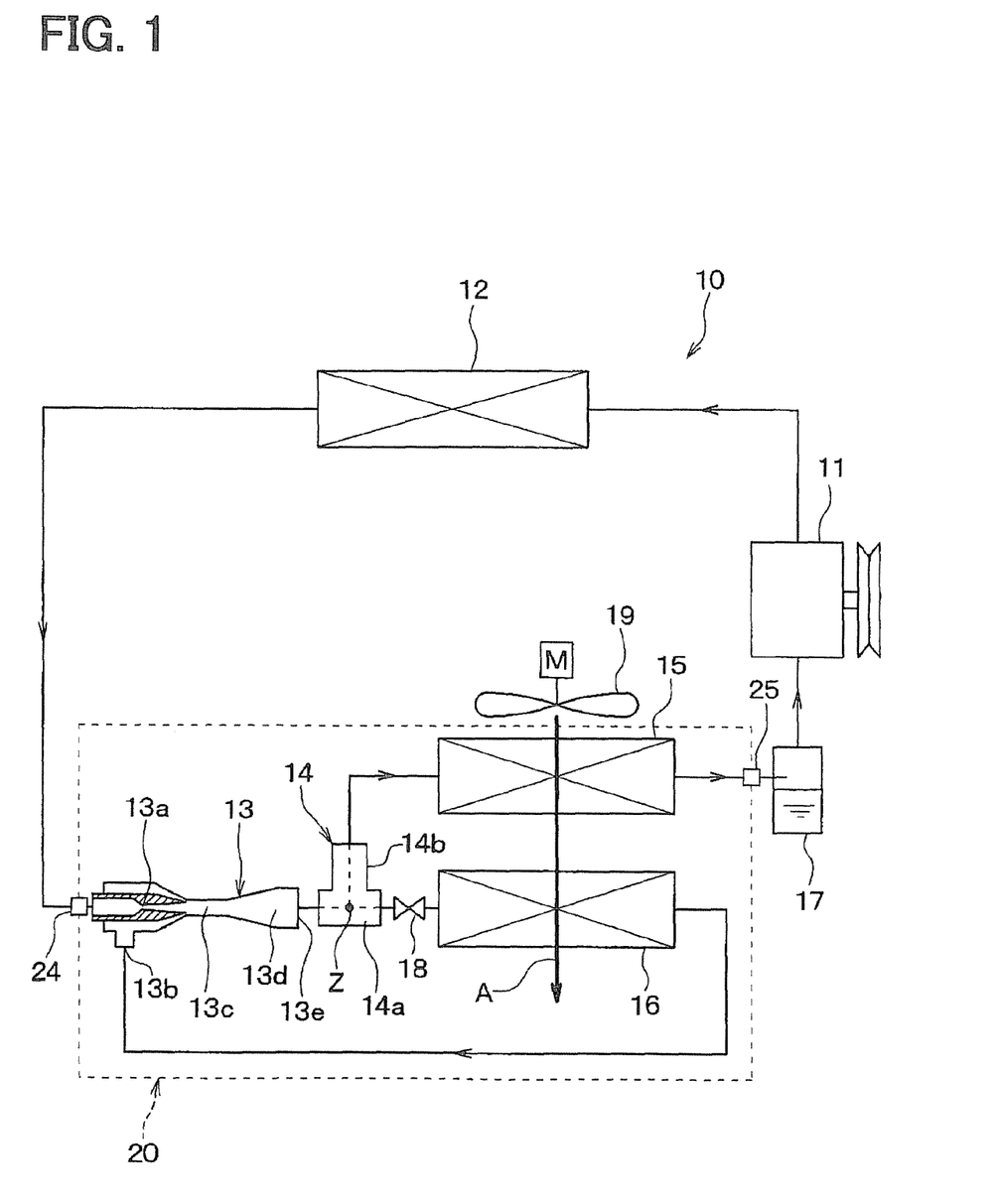
FIG. 1 is a refrigerant circuit diagram of an ejector-type refrigeration cycle for a vehicle according to a first embodiment of the present invention.

A first embodiment of the present invention will be described below based on FIGS. 1 to 3. FIG. 1 is an entire configuration diagram showing an example in which an ejector-type refrigeration cycle device 10 of the present invention is applied to an air conditioner for a vehicle. In the ejector-type refrigeration cycle 10, a compressor 11 is adapted to draw, compress, and discharge refrigerant. The compressor 11 is rotatably driven by receiving a driving force transmitted from an engine for vehicle running (not shown) via a pulley and a belt.

As the compressor 11, may be used either of a variable displacement compressor for being capable of adjusting a refrigerant discharge capacity depending on a change in compression capacity, or a fixed displacement compressor for adjusting a refrigerant discharge capacity by changing an operating efficiency of the compressor by intermittent connection of an electromagnetic clutch. The use of an electric compressor as the compressor 11 can adjust the refrigerant discharge capacity by adjustment of the number of revolutions of an electric motor.

A radiator 12 is connected to a refrigerant discharge side of the compressor 11. The radiator 12 is a heat exchanger for heat radiation which exchanges heat between high-pressure refrigerant discharged from the compressor 11 and outside air (i.e., air outside a vehicle compartment) blown by a cooling fan not shown to radiate heat from the high-pressure refrigerant.

In the ejector-type refrigeration cycle device 10 of the present embodiment, freon-based refrigerant is used as the refrigerant to construct a subcritical cycle whose high-pressure side refrigerant pressure does not exceed a critical pressure of the refrigerant. Thus, the radiator 12 serves as a condenser for cooling and condensing the refrigerant. A liquid receiver (not shown) for separating the refrigerant into liquid and gas phases and for storing therein the excessive liquid-phase refrigerant in the cycle is provided on the refrigerant outlet side of the radiator 12. The liquid-phase refrigerant is guided from the liquid receiver toward the downstream side.

The radiator 12 may be a so-called subcool condenser including a heat exchanging portion for condensation positioned on the upstream side of the refrigerant flow, the liquid receiver for separating the refrigerant introduced thereinto from the condensation heat exchanging portion into liquid and gas phases, and a heat exchanging portion for supercooling saturated liquid-phase refrigerant flowing from the liquid receiver.

An ejector 13 is connected to a refrigerant downstream side of the radiator 12. The ejector 13 serves as decompression means for decompressing the refrigerant, and also as refrigerant circulation means for circulating the refrigerant by a suction effect of the refrigerant flow injected at high velocity.

Specifically, the ejector 13 includes a nozzle portion 13a for decreasing the area of a passage of the high-pressure refrigerant flowing from the radiator 12 to a small level thereby to decompress the refrigerant. The ejector 13 also includes a refrigerant suction port 13b provided in communication with a refrigerant injection port of the nozzle portion 13a and adapted to draw the refrigerant flowing from a second evaporator 16 to be described later.

The ejector 13 further includes a mixing portion 13c disposed at a downstream side part of the refrigerant flow of the nozzle portion 13a and the refrigerant suction port 13b and adapted to mix the high-velocity refrigerant flow jetted from the nozzle portion 13a with the suction refrigerant drawn from the refrigerant suction port 13b. The ejector 13 also includes a diffuser 13d disposed on the downstream side of the refrigerant flow of the mixing portion 13c, for serving as a pressurizing portion.

The diffuser 13d is formed in such a shape to gradually increase the passage sectional area of the refrigerant, and has an effect of decelerating the refrigerant flow to increase the refrigerant pressure, that is, an effect of converting the velocity energy of the refrigerant into the pressure energy thereof.

A refrigerant distributor 14 for branching and distributing the refrigerant flow into a side of the first evaporator 15 and a side of the second evaporator 16 is connected to the downstream side of the ejector 13, specifically, is connected to an outlet 13e of the diffuser 13d.

The refrigerant distributor 14 allows the refrigerant discharged from the outlet 13e of the diffuser 13d to directly flow thereinto. The distributor 14 includes a circular first pipe-shaped portion 14a for allowing the refrigerant discharged from the outlet 13e of the diffuser 13d to directly flow thereinto and for allowing the introduced refrigerant to flow toward the second evaporator 16 side, and a circular second pipe-shaped portion 14b for allowing the refrigerant introduced into the first circular pipe-shaped portion 14a to flow out toward the first evaporator 15 side.

The first evaporator 15 connected to the downstream side of the second pipe-shaped portion 14b of the refrigerant distributor 14 is a heat exchanger for heat absorption which exchanges heat between one of refrigerant flows branched by the refrigerant distributor 14 and air to evaporate low-pressure refrigerant, thereby exhibiting a heat absorption effect. The outlet side of the first evaporator 15 is connected to the inlet side of an accumulator 17, and the outlet side of the accumulator 17 is connected to the refrigerant suction side of the compressor 11.

The accumulator 17 is a gas/liquid separator for separating the refrigerant into gas and liquid phases to allow the separated gas-phase refrigerant to flow into the suction side of the compressor 11. When the dryness of refrigerant flowing from the first evaporator 15 is high and the refrigerant flowing from the first evaporator 15 almost becomes the gas-phase refrigerant, the accumulator 17 may be removed.

The first evaporator 15 corresponds to an evaporator connected in series to decompression means in a normal vapor-compression refrigeration cycle, which is constructed of a compressor, a radiator, decompression means, and an evaporator connected in an annular shape. The first evaporator 15 is connected in series to the ejector 13 serving as the decompression means.

On the other hand, the second evaporator 16 is a heat exchanger for heat absorption which exchanges heat between the other of refrigerant flows branched by the refrigerant distributor 14 and air to evaporate low-pressure refrigerant, thereby exhibiting the heat absorption effect.

The refrigerant inlet side of the second evaporator 16 is connected to the refrigerant downstream side of the first pipe-shaped portion 14a of the refrigerant distributor 14 via a throttle mechanism 18. The refrigerant outlet side of the second evaporator 16 is connected to the refrigerant suction port 13b of the ejector 13.

Each of the first evaporator 15 and the second evaporator 16 can be constructed of two headers, a plurality of tubes for establishing communication between these headers, and fins provided in between these tubes. For example, the evaporator can be, for example, a header and tube type, or a drawn cup type heat exchanger.

The first and second evaporators 15 and 16 can be provided as an integrated structure in which at least one component of the evaporators is shared between the evaporators. The headers of the first and second evaporators 15 and 16 can be divided into a plurality of tanks so as to provide a desired serpentine refrigerant flow.

Each tank has one or both functions of distributing refrigerant into the tubes and of collecting the refrigerant from the tubes. One dynamic tank of these tanks is in direct communication with an outlet of the ejector 13 in the direction of jet flow.

The dynamic pressure tank allows the jet flow of refrigerant from the ejector 13 to be injected thereinto, while sufficiently keeping the dynamic pressure thereof. The dynamic pressure tank allows the dynamic pressure of the jet flow to be applied to inlets of the tubes.

On the other hand, a static pressure tank is positioned to deviate from the direction of jet flow from the ejector 13. The static pressure tank allows the refrigerant to be introduced thereinto via an opening orthogonal to the direction of jet flow from the ejector 13. As a result, the refrigerant is drawn and introduced into the static pressure tank, and then gently flows into the tank. While the static pressure tank distributes the refrigerant into the tubes, the distributed refrigerant is drawn into these tubes.

The throttle mechanism 18 serves as the decompression means for adjusting the flow amount of refrigerant flowing into the second evaporator 16. In an example shown in FIG. 2, the throttle mechanism 18 is constructed of a convergent nozzle, which hardly decreases the flow velocity of refrigerant in a decompression and expansion process. Thus, the dynamic pressure of the refrigerant on the inlet side of the second evaporator 16 is difficult to decrease, while enabling the refrigerant to be decompressed and expanded isentropically.

The throttle mechanism 18 is directly mounted on an outlet of the refrigerant distributor 14. The throttle mechanism 18 is positioned at an extension in the direction of jet flow from the ejector 13. An axis of a flow path partitioned by the throttle mechanism 18 corresponds to the extension of the jet flow from the ejector 13.

In the present embodiment, the first and second evaporators 15 and 16 with a structure to be described later are assembled to an integrated structure. The first and second evaporators 15 and 16 are accommodated in a case not shown. A common electric blower 19 blows air (air to be cooled) in an air passage formed in the case in the direction indicated by the arrow "A". The blown air is cooled by the first and second evaporators 15 and 16.

The air cooled by the first and second evaporators 15 and 16 is fed to a common space to be cooled (not shown). Thus, the common space to be cooled is cooled by the first and second evaporators 15 and 16. The first evaporator 15 connected in series to the ejector 13 among the first and second evaporators 15 and 16 is disposed on the upstream side (windward side) of the air flow A, and the second evaporator 16 connected to the refrigerant suction port 13b of the ejector 13 is disposed on the downstream side (leeward side) of the air flow A.

When the ejector-type refrigeration cycle device 10 of the present embodiment is applied to a refrigeration cycle device for air conditioning of a vehicle, a space in a vehicle compartment is the space to be cooled. When the ejector-type refrigeration cycle device 10 of the present embodiment is applied to a refrigeration cycle device for a freezer car, a space in a freezer and refrigerator of the freezer car is the space to be cooled.

In the present embodiment, the ejector 13, the refrigerant distributor 14, the first and second evaporators 15 and 16, and the throttle mechanism 18 are assembled as one integrated unit 20. Now, a specific example of the integrated unit 20 will be described with reference to FIGS. 2 and 3. FIG. 2 is a perspective view schematically showing an entire structure of the integrated unit 20, and FIG. 3 is a sectional view of upper tanks of the first and second evaporators 15 and 16.

Figure 2:
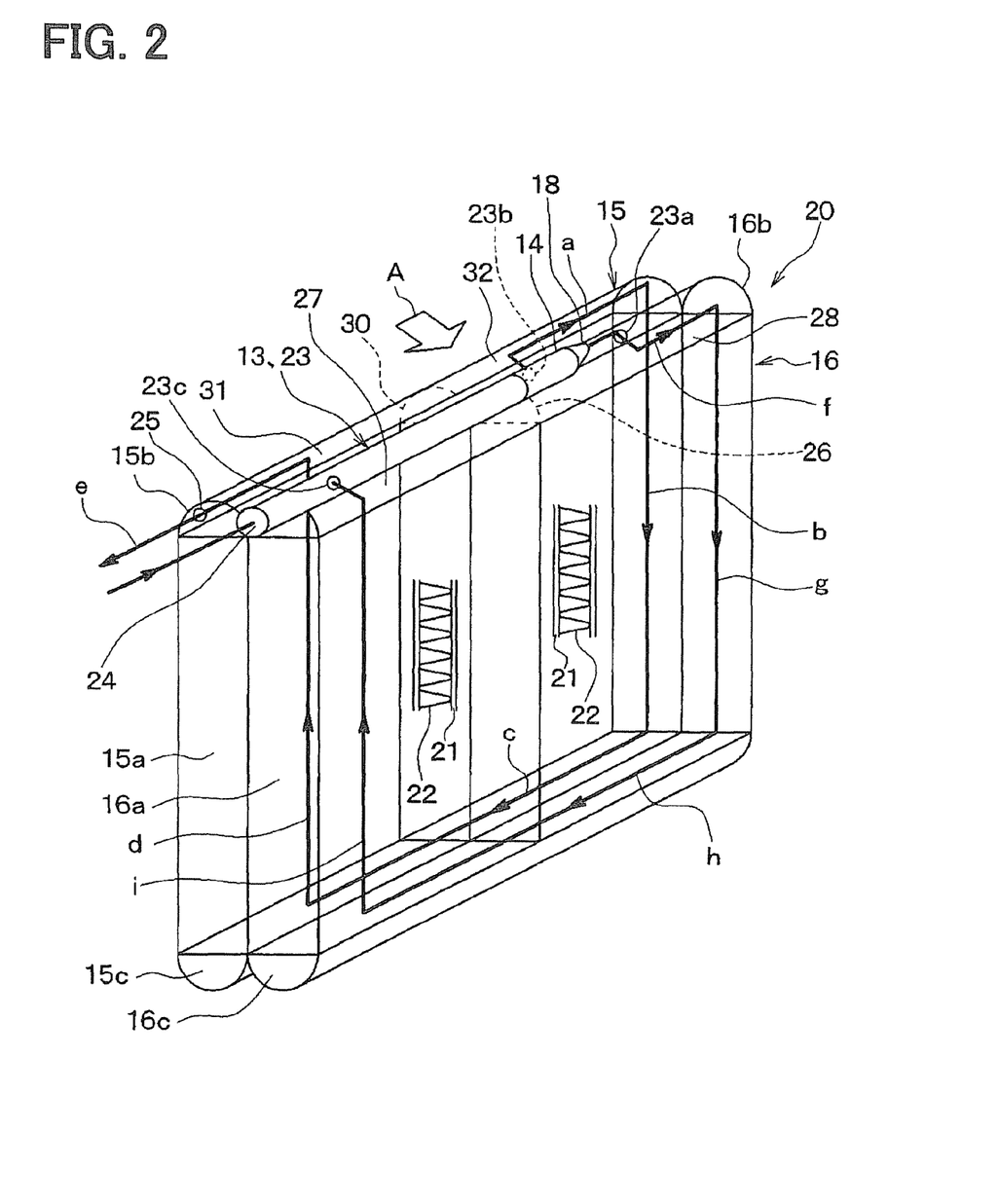
FIG. 2 is a perspective view showing a schematic structure of an integrated unit of the first embodiment.

In the example shown in FIG. 2, the first and second evaporators 15 and 16 are completely integrated with each other as one evaporator structure. Thus, the first evaporator 15 constitutes an upstream side area of the air flow A in the one evaporator structure, and the second evaporator 16 constitutes a downstream side area of the air flow A in the one evaporator structure.

The first evaporator 15 and the second evaporator 16 have the same basic structure, and respectively include heat exchange cores 15a and 16a, and tanks 15b, 15c, 16b, and 16c positioned on both upper and lower sides of the heat exchange cores 15a and 16a, respectively.

The heat exchange cores 15a and 16a each include a plurality of tubes 21 vertically extending. A passage through which a medium to be subjected to heat exchange passes, that is, through which air to be cooled in the present embodiment flows is formed between the tubes 21. Fins 22 are disposed between the tubes 21, so that the tubes 21 and the fins 22 can be bonded together.

Each of the heat exchange cores 15a and 16a is constructed of a lamination of the tubes 21 and the fins 22. The tubes 21 and the fins 22 are alternately laminated in the lateral direction of each of the heat exchange cores 15a and 16a. In other embodiments, a structure without fins 22 can be employed.

FIG. 2 shows only a part of the lamination of the tubes 21 and the fins 22. The lamination of the tubes 21 and the fins 22 is formed over the entire area of the heat exchange cores 15a and 16a to allow the blown air from the electric blower 19 to pass through voids formed in the lamination.

The tube 21 constitutes a refrigerant passage, and is configured by a flat tube having a flat sectional shape along the air flow direction A. The fin 22 is a corrugated fin formed by bending a thin plate member in a wave-like shape, and connected to the flat outer surface of the tube 21 to enlarge an area of heat transmission on the air side.

The tube 21 of the heat exchange core 15a and the tube 21 of the heat exchange core 16a form the respective independent refrigerant passages, and thereby both the upper and lower tanks 15b and 15c of the first evaporator 15 and both the upper and lower tanks 16b and 16c of the second evaporator 16 form the respective independent refrigerant passage spaces.

Both the upper and lower ends of the tube 21 of the heat exchange core 15a are inserted into both the upper and lower tanks 15b and 15c of the first evaporator 15. The tanks 15b and 15c have tube fitting holes (not shown) connected. Both the upper and lower ends of the tube 21 are in communication with the internal spaces of the tanks 15b and 15c.

Likewise, both the upper and lower ends of the tube of the heat exchange core 16a are inserted into both the upper and lower tanks 16b and 16c of the second evaporator 16. The tanks 16b and 16c have tube fitting holes (not shown) connected. Both upper and lower ends of the tube 21 are in communication with the internal spaces of the tanks 16b and 16c.

Thus, the tanks 15b, 15c, 16b, and 16c on both upper and lower sides serve to distribute a refrigerant flow into the tubes 21 of the respective heat exchange cores 15a and 16a, and to collect the refrigerant flows from the tubes 21.

The two upper tanks 15b and 16b are adjacent to each other, and the two lower tanks 15c and 16c are adjacent to each other. Therefore, the two upper tanks 15b and 16b can be integrally formed with each other, and the two lower tanks 15c and 16c can be integrally formed with each other. It is apparent that the two upper tanks 15b and 16b and the two lower tanks 15c and 16c may be formed as respective independent members.

A separate tank 23 for accommodating therein the ejector 13 constitutes parts of the first evaporator 15 and of the second evaporator 16. The tank 23 is positioned in a middle portion between the upper tank 15b of the first evaporator 15 and the upper tank 16b of the second evaporator 16. The tank 23 is formed in a cylindrical shape extending in the longitudinal direction of both tanks 15b and 16b. In the present embodiment, the separate tank 23 may be integrally formed with the upper tanks 15b and 16b.

Specific material for components of the evaporator, such as the tube 21, the fin 22, the tanks 15b, 15c, 16b, 16c, and 23, and the like, is preferably aluminum, which is metal having excellent thermal conductivity and brazing characteristics. The entire structures of the first and second evaporators 15 and 16 can be assembled by integrally brazing each component formed of the aluminum material.

In contrast, the ejector 13 has a fine passage formed in the nozzle portion 13a with high accuracy. If the ejector 13 is integrally brazed to the first and second evaporators 15 and 16, the heat in brazing at a high temperature (at a brazing temperature of aluminum of about 600° C.) may deform the nozzle portion 13a, and thereby it is difficult to maintain the shape, dimension, and the like of the passage in the nozzle portion 13a according to a predetermined design.

Thus, the ejector 13 is assembled to the evaporator side after integrally brazing the first and second evaporators 15 and 16. The ejector 13 is integrally assembled to the refrigerant distributor 14 and the throttle mechanism 18 before being assembled to the evaporator side.

More specifically, an assembly structure including the ejector 13, the refrigerant distributor 14, the throttle mechanism 18, and the first and second evaporators 15 and 16 will be described below.

One refrigerant inlet 24 of the integrated unit 20 shown in FIG. 1 is formed in the separate tank 23. One refrigerant outlet 25 of the integrated unit 20 shown in FIG. 1 is formed in the upper tank 15b of the first evaporator 15.

A partition plate 26 is a member disposed substantially at the center in the longitudinal direction of the internal space of the upper tank 16b of the second evaporator 16, and blazed to an inner wall surface of the upper tank 16b. The partition plate 26 serves to partition the internal space of the upper tank 16b into two spaces in the longitudinal direction of the tank, namely, a left space 27 and a right space 28.

A partition plate 30 is disposed substantially at the center in the longitudinal direction of the internal space of the upper tank 15b of the first evaporator 15. The partition plate 30 partitions the internal space of the upper tank 15b into two spaces in the longitudinal direction, namely, a left space 31 and a right space 32.

The ejector 13 is formed by inserting the nozzle portion 13a into a body 13f after separately forming the nozzle portion 13a and the body 13f other than the nozzle portion 13a, and fixing the nozzle portion 13a to the body 13f by press fitting or caulking.

More specifically, the nozzle portion 13a of the ejector 13 is formed of a metallic material, such as stainless, or brass. The body 13f is formed of a metallic material, such as copper or aluminum, but may be formed of a resin material (i.e., non-metallic material).

Figure 4:
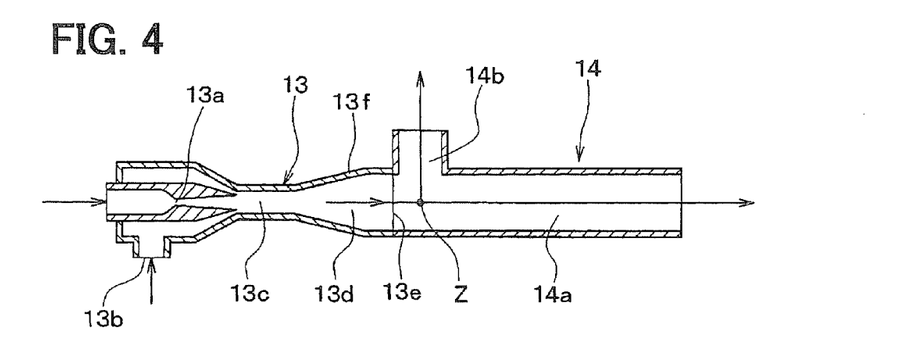
FIG. 4 is a sectional view showing a schematic structure of a refrigerant distributor in the integrated unit shown in FIG. 2.

In the present embodiment, the refrigerant distributor 14 is formed of aluminum material, like the evaporator component, by connecting the first pipe-shaped portion 14a with the second pipe-shaped portion 14b using connection means, such as welding.

In the embodiment shown in FIG. 4, the second pipe-shaped portion 14b protrudes from an outer peripheral surface of an end portion of the first pipe-shaped portion 14a on the upstream side of the refrigerant flow (at the left end shown in FIG. 4) in the direction orthogonal to the first pipe-shaped portion 14a. The second pipe-shaped portion 14b does not necessarily need to protrude strictly in the direction orthogonal to the first pipe-shaped portion 14a, and may protrude substantially in the direction orthogonal to the first pipe-shaped portion 14a.

The first and second pipe-shaped portions 14a and 14b may be formed of resin, and may be bonded to each other by adhesive. The refrigerant distributor 14 may be formed only by the first pipe-shaped portion 14a. That is, the outer peripheral surface of the first pipe-shaped portion 14a is provided with a through hole, from which the refrigerant flows out toward the first evaporator 15, so as to configure the refrigerant distributor 14 without providing the second pipe-shaped portion 14b.

The refrigerant distributor 14 may be formed by providing a plurality of refrigerant passages in a metal or resin block having a rectangular parallelepiped.

In the present embodiment, the throttle mechanism (e.g., taper nozzle) 18 is formed of aluminum material, and the ejector 13, the refrigerant distributor 14, and the throttle mechanism 18 are integrally bonded together by using bonding means, such as brazing, or welding. In this case, in order to prevent thermal deformation of the nozzle portion 13a, it is desirable that the refrigerant distributor 14 and the throttle mechanism 18 are bonded to each other before assembling the nozzle portion 13a of the ejector 13 to the body 13f.

It is apparent that the ejector 13, the refrigerant distributor 14, and the throttle mechanism 18 may be integrally fastened together via fastening means, such as screws. When the body 13f of the ejector 13, the refrigerant distributor 14, and the throttle mechanism 18 are made of resin, the components may be integrally bonded together by adhesive. Alternatively, the refrigerant distributor 14 may be integrally formed with the body 13f of the ejector 13, or may be integrally formed with the throttle mechanism 18.

After an assembly step (brazing step) of integrally brazing the first and second evaporators 15 and 16 and the like, the ejector 13, the refrigerant distributor 14 and the throttle mechanism 18 integrated are inserted into the upper tank 16b through the refrigerant inlet 24.

Figure 3:
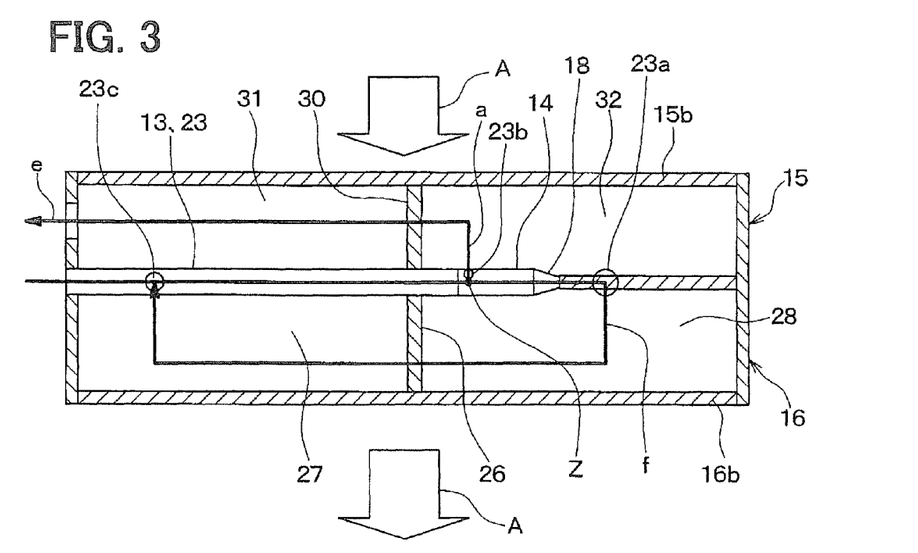
FIG. 3 is a sectional view of tanks of evaporators in the integrated unit shown in FIG. 2.

The ejector 13, the refrigerant distributor 14, and the throttle mechanism 18 integrated, and the cylindrical separate tank 23 extend up to the back (right) side away from the partition plates 26 and 30 of both tanks 15b and 16b shown in FIG. 3.

Figure 5:
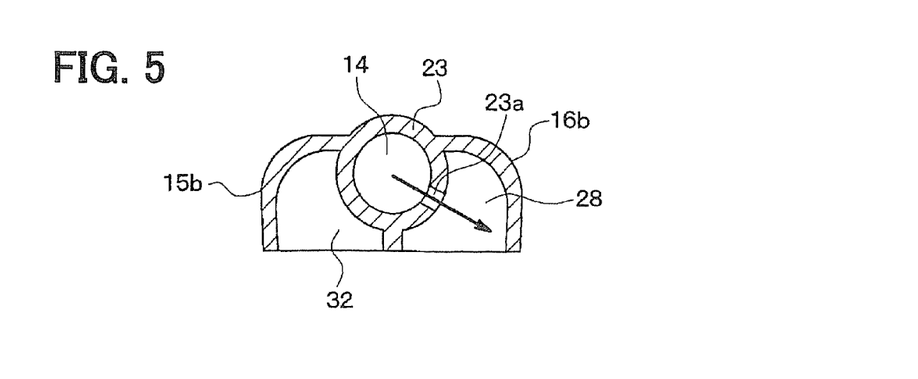
FIG. 5 is another sectional view of the tanks of the evaporators in the integrated unit shown in FIG. 2.
Figure 6:
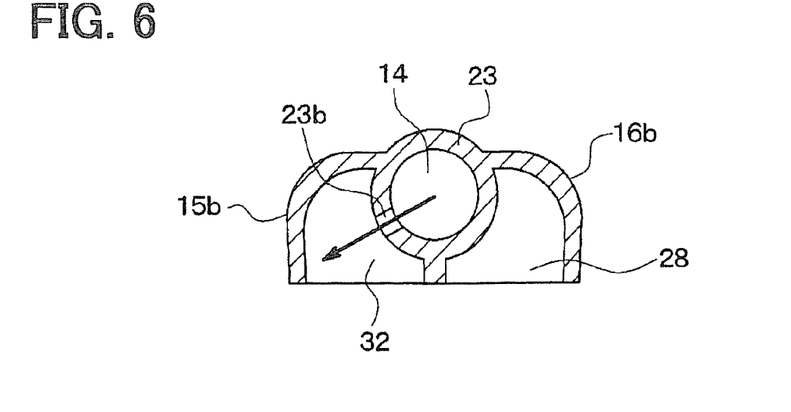
FIG. 6 is a sectional view of the tanks of the evaporators in the integrated unit shown in FIG. 2.

As schematically shown in FIG. 3, the separate tank 23 has through holes 23a to 23c formed therein. FIGS. 5 and 6 are sectional views of the upper tanks of the first and second evaporators 15 and 16 taken in a direction perpendicular to the longitudinal direction. FIG. 5 shows a sectional view of a portion with the through hole 23a formed therein, and FIG. 6 shows a sectional view of a portion with the through hole 23b formed therein.

Each of the through holes 23a to 23c is a lateral hole penetrating the circumferential wall of the separate tank 23. The outlet of the throttle mechanism 18 is in communication with the inside of the right space 28 of the upper tank 16b of the second evaporator 16 via the through hole 23a.

Likewise, a downstream side opening of the second pipe-shaped portion 14b of the refrigerant distributor 14 is in communication with the inside of the right space 32 of the upper tank 15b of the first evaporator 15 via the through hole 23b. The refrigerant suction port 13b of the ejector 13 is in communication with the inside of the left space 27 of the upper tank 16b of the second evaporator 16 via the through hole (lateral hole) 23c.

The left end of the ejector 13 in the longitudinal direction (left end shown in FIG. 3) corresponds to the inlet of the nozzle portion 13a shown in FIG. 1, and is fitted into the refrigerant inlet 24 at the inner wall surface thereof using a seal mechanism (e.g., an O ring or the like not shown) to be seal-fixed thereto.

The fixing of the ejector 13 in the longitudinal direction may be performed by use of, for example, screw fixing means (not shown).

With above arrangement, refrigerant flow paths of the entire integrated unit 20 will be specifically described below based on FIGS. 2 to 4. The refrigerant flowing from the refrigerant inlet 24, first, is decompressed through the ejector 13 (the nozzle portion 13a, the mixing portion 13c, and the diffuser 13d in that order). The low-pressure refrigerant decompressed flows from an upstream side opening of the first pipe-shaped portion 14a into the refrigerant distributor 14. The refrigerant flowing from the outlet 13e of the ejector 13 into the refrigerant distributor 14 is branched by a branch portion Z, and then flows out of the downstream side opening of the first pipe-shaped portion 14a and the downstream side opening of the second pipe-shaped portion 14b.

At this time, the first pipe-shaped portion 14a is formed to be coaxially disposed with respect to the diffuser 13d, so that the refrigerant flowing thereinto via the upstream side opening of the first pipe-shaped portion 14a flows out of the downstream side opening of the first portion 14a without unnecessarily decreasing the flow velocity thereof. Thus, while the refrigerant flow is branched at the branch portion Z of the refrigerant distributor 14, the refrigerant flowing out of the downstream side opening of the first pipe-shaped portion 14a remains at a constant dynamic pressure of the refrigerant flowing from the diffuser 13d.

An open area of the downstream side opening of the second pipe-shaped portion 14b and an open area of the downstream side opening of the first pipe-shaped portion 14a are set to have appropriate values, so that the ratio of the flow amount of refrigerant flowing into the first evaporator 15 to that of refrigerant flowing into the second evaporator 16 can be adjusted appropriately. Thus, the refrigerant can be supplied to the first evaporator 15 and the second evaporator 16 at appropriate flow amounts.

The refrigerant flowing from the downstream side opening of the second pipe-shaped portion 14b flows into the right space 32 of the upper tank 15b of the first evaporator 15 through the through hole 23b of the separate tank 23 as indicated by the arrow "a".

The refrigerant in the right space 32 descends through the tubes 21 in the right portion of the heat exchange core 15a as indicated by the arrow "b" to flow into the right portion of the lower tank 15c. Since no partition plate is provided in the lower tank 15c, the refrigerant moves from the right portion of the lower tank 15c toward the left portion thereof as indicated by the arrow "c".

The refrigerant in the left portion of the lower tank 15c rises through the tubes 21 in the left portion of the heat exchange core 15a as indicated by the arrow "d" to flow into the left space 31 of the upper tank 15b. Then, the refrigerant flows out of the refrigerant outlet 25 of the upper tank 15b as indicated by the arrow "e".

On the other hand, the refrigerant flowing out of the downstream side opening of the first pipe-shaped portion 14a is first decompressed through the throttle mechanism 18. The low-pressure refrigerant decompressed by the throttle mechanism 18 flows into the right space 28 of the upper tank 16b of the second evaporator 16 through the through hole 23a of the separate tank 23 as indicated by the arrow "f".

The refrigerant in the right space 28 descends through the tubes 21 in the right portion of the heat exchange core 16a as indicated by the arrow "g" to flow into the right portion of the lower tank 16c. Since no partition plate is provided in the lower tank 16c, the refrigerant moves from the right portion of the lower tank 16c toward the left portion thereof as indicated by the arrow "h".

The refrigerant in the left portion of the lower tank 16c rises through the tubes 21 in the left portion of the heat exchange core 16a as indicated by the arrow "i" to flow into the left space 27 of the upper tank 16b. Since the refrigerant suction port 13b of the ejector 13 is in communication with the left space 27 via the through hole 23c of the separate tank 23, the refrigerant in the left space 27 is drawn from the refrigerant suction port 13b into the ejector 13.

The integrated unit 20 has the refrigerant flow path structure as described above. In the entire integrated unit 20, only one refrigerant inlet 24 can be provided in the separate tank 23, and only one refrigerant outlet 25 can be provided in the upper tank 15b.

Next, the operation of the first embodiment will be described. When the compressor 11 is driven by a vehicle engine, high-temperature and high-pressure refrigerant compressed by and discharged from the compressor 11 flows into the radiator 12. The high-temperature refrigerant is cooled and condensed by outside air at the radiator 12. The high-pressure refrigerant flowing out of the radiator 12 flows into the ejector 13, and then the refrigerant flowing into the ejector 13 is decompressed and expanded by the nozzle portion 13a. Thus, the pressure energy of the refrigerant is converted into the velocity energy thereof by the nozzle portion 13a. The refrigerant is injected at a high velocity from an injection port of the nozzle portion 13a. A decrease in pressure of the refrigerant at this time causes the refrigerant (gas-phase refrigerant) having passed through the second evaporator 16 to be drawn from the refrigerant suction port 13b.

The refrigerant injected from the nozzle portion 13a and the refrigerant drawn into the refrigerant suction port 13b are mixed by the mixing portion 13c provided on the downstream side of the nozzle portion 13a to flow into the diffuser 13d. The diffuser 13d converts the velocity (expansion) energy of the refrigerant into the pressure energy by enlarging the sectional area of the passage so as to increase the pressure of the refrigerant.

The refrigerant flowing from the diffuser 13d of the ejector 13 is branched by the refrigerant distributor 14, and then flows out of the downstream side opening of the second pipe-shaped portion 14b and the downstream side opening of the first pipe-shaped portion 14a. The refrigerant flowing from the downstream side opening of the second pipe-shaped portion 14b flows through the refrigerant flow path in the first evaporator 15 as indicated by the arrows "a" to "e". During this time, in the heat exchange core 15a of the first evaporator 15, the low-temperature and low-pressure refrigerant absorbs heat from the blown air in the direction indicated by the arrow "A" so as to be evaporated. The gas-phase refrigerant evaporated is drawn from the refrigerant outlet 25 into the compressor 11, and then compressed again in the compressor 11.

On the other hand, the refrigerant flowing out of the downstream side opening of the first pipe-shaped portion 14a is decompressed by the throttle mechanism 18 to become a low-pressure refrigerant, which flows through the refrigerant flow path indicated by the arrows "f" to "i" shown in FIG. 2 in the second evaporator 16. During this time, in the heat exchange core 16a of the second evaporator 16, the low-temperature and low-pressure refrigerant absorbs heat from the blown air having passed through the first evaporator 15 so as to be evaporated. The gas-phase refrigerant evaporated is drawn from the refrigerant suction port 13b into the ejector 13.

As mentioned above, in the present embodiment, the refrigerant on the downstream side of the diffuser 13d of the ejector 13 can be distributed among and supplied to the first and second evaporators 15 and 16 by the refrigerant distributor 14, so that the first and second evaporators 15 and 16 can simultaneously exhibit a cooling effect. Thus, the air cooled by both first and second evaporators 15 and 16 is blown off into the space to be cooled, thereby enabling cooling of the space to be cooled.

Further, in the present embodiment, the dynamic pressure of the refrigerant flowing from the ejector 13 can be used to circulate the refrigerant in the second evaporator 16.

That is, the refrigerant distributor 14 is configured such that the refrigerant flowing from the downstream side opening of the first pipe-shaped portion 14a, or the refrigerant distributed toward the second evaporator 16 remains at a constant dynamic pressure of the refrigerant flowing from the diffuser 13d. The throttle mechanism 18 is constructed by the taper nozzle to suppress the decrease in dynamic pressure while decompressing the refrigerant, so that the dynamic pressure of the refrigerant flowing from the ejector 13 can be applied to the inside of the second evaporator 16.

Thus, when the refrigerant flows into the second evaporator 16, not only a difference in pressure between a static pressure of the refrigerant on the downstream side of the diffuser 13d and a static pressure of the refrigerant at the refrigerant suction port 13b, but also a dynamic pressure of the refrigerant on the downstream side of the diffuser 13d can be applied so as to surely allow the refrigerant to flow into the second evaporator 16.

Because the suction side of the compressor 11 is connected to the downstream side of the first evaporator 15, the refrigerant can also flow surely into the first evaporator 15 by a suction effect of the compressor 11. Thus, both the first and second evaporators 15 and 16 can appropriately exhibit the refrigeration capacity of the evaporators, thereby improving the refrigeration capacity of the entire cycle.

Because the suction side of the compressor 11 is connected to the downstream side of the first evaporator 15, the refrigerant whose pressure is increased by the diffuser 13d of the ejector 13 can flow into the compressor 11. Thus, a suction pressure of the compressor 11 can be increased thereby to decrease a driving power of the compressor 11, thereby resulting in improved cycle efficiency (COP).

The ratio of the flow amount of refrigerant flowing into the first evaporator 15 to that of refrigerant flowing into the second evaporator 16 is adjusted by the open area of the downstream side opening of the second pipe-shaped portion 14b and the open area of the downstream side opening of the first pipe-shaped portion 14a. Thus, the refrigerant can be appropriately distributed into the first and second evaporators 15 and 16, while the flow amount of the refrigerant circulating through the entire cycle can be adjusted with the simple cycle structure.

The diffuser 13d of the ejector 13, the refrigerant distributor 14, the first evaporator 15, and the second evaporator 16 are directly connected together without piping. Such connection maintains the dynamic pressure of the refrigerant flowing from the ejector 13 when the refrigerant flow is further branched.

The decompression effect of the throttle mechanism 18 can effectively decrease a refrigerant evaporation pressure (refrigerant evaporation temperature) of the second evaporator 16 with respect to a refrigerant evaporation pressure (refrigerant evaporation temperature) of the first evaporator 17. The throttle mechanism 18 isentropically decompresses and expands the refrigerant to enlarge a difference in enthalpy of the refrigerant between the inlet and outlet of the second evaporator 16, thereby enabling further improvement of the refrigeration capacity of the second evaporator 18.

The ejector 13, the refrigerant distributor 14, the first and second evaporators 15 and 16, and the throttle mechanism 18 are assembled to one structure shown in FIG. 2, that is, as the integrated unit 20. Thus, the entire integrate unit 20 only requires one refrigerant inlet 24 and one refrigerant outlet 25.

As a result, in mounting the ejector-type refrigeration cycle device 10 on the vehicle, various components (13, 14, 15, 16, and 18) are incorporated in the entire integrated unit 20 with one refrigerant inlet 24 connected to the outlet side of the radiator 12, and with one refrigerant outlet 25 connected to the suction side of the compressor 11, and thereby it can terminate a piping connection work.

At the same time, the use of the structure incorporating the ejector 13, the refrigerant distributor 14 and the throttle mechanism 18 in the evaporator tank can also make the entire body of the integrated unit 20 compact and simple, thereby reducing a mounting space.

Thus, the mounting performance of the ejector-type refrigeration cycle device 10 including the evaporators 15 and 16 on the vehicle can be greatly improved as compared to a structure including various components (13, 14, 15, 16, and 18) connected to one another via piping. Furthermore, the refrigeration cycle device 10 can achieve reduction in the number of components of the cycle, and further in cost.

The use of the integrated unit 20 can replace an evaporator of an existing expansion valve cycle with the integrated unit 20, thereby changing the existing expansion valve cycle into the ejector-type refrigeration cycle of the present invention. Thus, it is advantageous from a practical standpoint.

Further, because the entire integrated unit 20 only requires one refrigerant inlet 24 and one refrigerant outlet 25, it can facilitate the work of replacing the evaporator of the existing expansion valve cycle with the integrated unit 20.

Additionally, the use of the integrated unit 20 can have the following subsidiary effects, including improvement of cooling performance. That is, the integrated unit 20 can reduce a length of a connection passage between the above-mentioned various components (13, 14, 15, 16, 18) to a small value, thereby reducing a loss in refrigerant pressure at the refrigerant flow path, while effectively reducing heat exchange between the low-pressure refrigerant and peripheral atmosphere. Thus, the first and second evaporators 15 and 16 can have improved cooling performance.

In particular, the second evaporator 16 can decrease the evaporation pressure by a decrease in loss of pressure of the refrigerant due to the abolishment of connection piping between the outlet side of the second evaporator and the ejector refrigerant suction port 13b. Thus, the cooling performance of the second evaporator 16 can be effectively improved without increasing the power of the compressor.

Since the ejector 13 is disposed in a low-temperature atmosphere within the evaporator tank, a heat insulating process of the ejector 13, such as bonding of a heat insulating material, can be omitted.

Although in the present embodiment the taper nozzle is used as the throttle mechanism 18, a Laval nozzle may be used which includes a throat portion with the smallest passage area in a midway point of the refrigerant passage and a divergent portion whose inner diameter is gradually enlarged after the throat portion.

(Second Embodiment)

In the above-described first embodiment, the first pipe-shaped portion 14a of the refrigerant distributor 14 has a straight line shape. In the second embodiment, as shown in FIG. 7, a first pipe-shaped portion 33a of a refrigerant distributor 33 has such a shape that an end portion of the first pipe-shaped portion 33a on a downstream side of the refrigerant flow is bent at a right angle.

Figure 7:
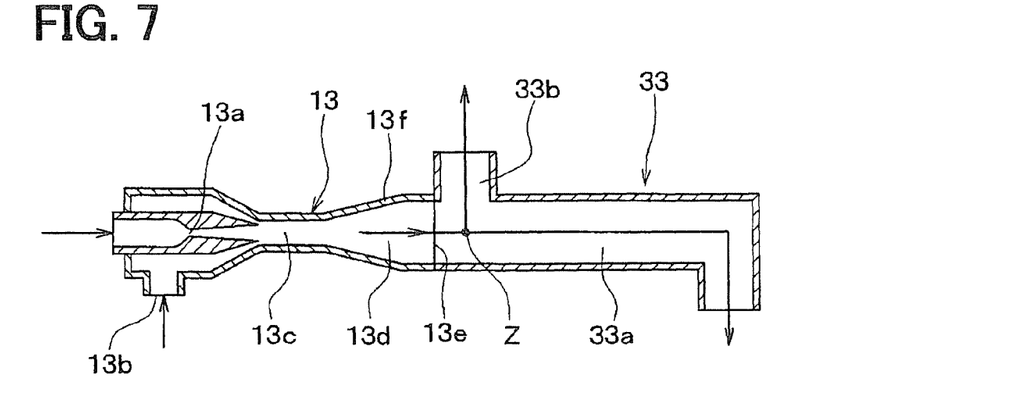
FIG. 7 is a sectional view showing a schematic structure of a refrigerant distributor according to a second embodiment of the present invention.

A second pipe-shaped portion 33b of the refrigerant distributor 33 protrudes in the direction (upward as shown in FIG. 7) opposite to the bending direction (downward direction as shown in FIG. 7) of the downstream side end portion of the first pipe-shaped portion 33a.

In the present embodiment, the throttle mechanism 18 is removed. In the present embodiment, a through hole 23a of a separate tank 23 is disposed opposite to a downstream side opening of the first pipe-shaped portion 33a.

Thus, a distance between the downstream side opening of the first pipe-shaped portion 33a and the through hole 23a can be shortened thereby to suppress a decrease in dynamic pressure of the refrigerant between the downstream side opening of the first pipe-shaped portion 33a and the through hole 23a as compared to the first embodiment. Thus, the refrigerant can surely flow into the second evaporator 16.

The first pipe-shaped portion 33a is not necessarily bent strictly at a right angle, and may be bent approximately at a right angle.

(Third Embodiment)

Figure 8:
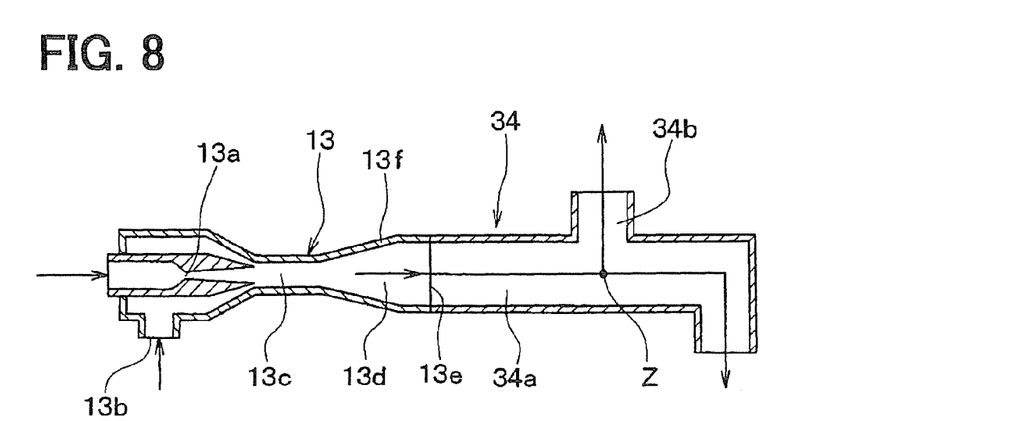
FIG. 8 is a sectional view showing a schematic structure of a refrigerant distributor according to a third embodiment of the present invention.

In the above-described second embodiment, the second pipe-shaped portion 33b of the refrigerant distributor 33 protrudes from the outer peripheral surface at the upstream end portion of the refrigerant flow of the first pipe-shaped portion 33a. In the third embodiment, as shown in FIG. 8, a second pipe-shaped portion 34b of a refrigerant distributor 34 protrudes from an outer peripheral surface of a middle part of a first pipe-shaped portion 34a of the refrigerant distributor 34 in the refrigerant flow direction.

Also, the present embodiment can exhibit the same effects as those in the above-described second embodiment.

(Fourth Embodiment)

Figure 9:
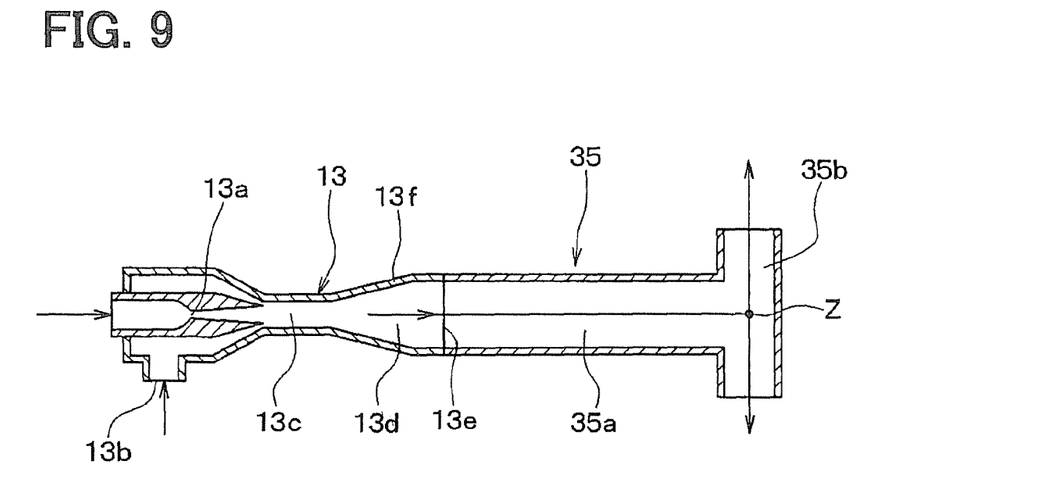
FIG. 9 is a sectional view showing a schematic structure of a refrigerant distributor according to a fourth embodiment of the present invention.

In a fourth embodiment, as shown in FIG. 9, a refrigerant distributor 35 has a T-like shape. More specifically, the refrigerant distributor 35 includes a first straight pipe-shaped portion 35a for allowing the refrigerant discharged from the outlet 13e of the ejector 13 to directly flow thereinto, and a second straight pipe-shaped portion 35b for allowing the refrigerant to flow out toward the first evaporator 15 side and the second evaporator 16 side. The second pipe-shaped portion 35b is connected to the first piped-shaped portion 35a at a right angle at the downstream end of the first pipe-shaped portion 35a.

In the present embodiment, both of the refrigerant distributed to the first evaporator 15 side and the refrigerant distributed to the second evaporator 16 side remain at a dynamic pressure of the refrigerant flowing from the diffuser 13d, so that the dynamic pressure of the refrigerant flowing from the ejector 13 can be applied not only to the second evaporator 16, but also the inside of the first evaporator 15.

Thus, the dynamic pressure of the refrigerant on the downstream side of the diffuser 13d in addition to the suction effect of the compressor 11 can be surely applied when the refrigerant flows into the first evaporator 15, thereby surely allowing the refrigerant to flow into the first evaporator 15.

The refrigerant distributor 35 does not necessarily have strictly the T-like shape, and may have a substantially T-like shape. For example, the second pipe-shaped portion 35b may be connected to the first pipe-shaped portion 35a approximately at a right angle.

(Fifth Embodiment)

Figure 10:
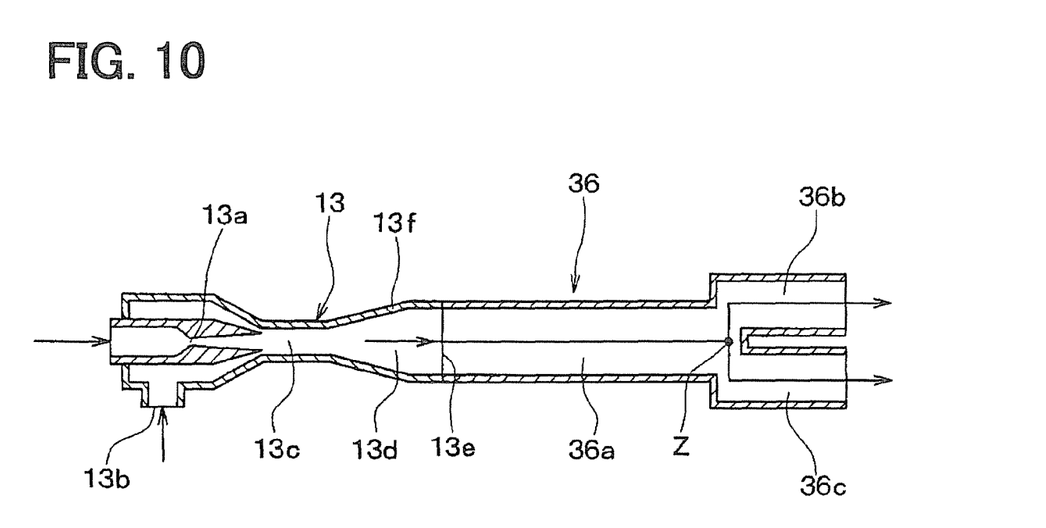
FIG. 10 is a sectional view showing a schematic structure of a refrigerant distributor according to a fifth embodiment of the present invention.

In a fifth embodiment, as shown in FIG. 10, a refrigerant distributor 36 includes a first linear pipe-shaped portion 36a for allowing the refrigerant discharged from the outlet 13e to directly flow thereinto, a second linear pipe-shaped portion 36b for allowing the refrigerant to flow out toward the first evaporator 15, and a third linear pipe-shaped portion 36c for allowing the refrigerant to flow out toward the second evaporator 16.

The second pipe-shaped portion 36b and the third pipe-shaped portion 36c are connected to the downstream end of the first pipe-shaped portion 36a, and disposed in parallel to the first pipe-shaped portion 36a.

A space portion (not shown) on the downstream side of the internal space of the separate tank 23 away from the second pipe-shaped portion 36b and the third pipe-shaped portion 36c is partitioned into two spaces, namely, a space on the first evaporator 15 side and a space on the second evaporator 16 side. A through hole 23b is arranged in the space on the first evaporator 15 side and a through hole 23a is arranged in the space on the second evaporator 16 side.

Thus, the refrigerant flowing from the second pipe-shaped portion 36b flows into the right space 32 of the upper tank 15b of the first evaporator 15 via the through hole 23b, and the refrigerant flowing from the third pipe-shaped portion 36c flows into the right space 28 of the upper tank 16b of the second evaporator 16 via the through hole 23a.

Also the present embodiment can exhibit the same effects as those in the above-mentioned fourth embodiment.

The second pipe-shaped portion 36b and the third pipe-shaped portion 36c are not necessarily arranged strictly in parallel to the first pipe-shaped portion 36a, and may be arranged substantially in parallel to the first pipe-shaped portion 36a.

(Other Embodiments)

The invention is not limited to the embodiments disclosed above and various modifications can be made to those embodiments.

(1) In the first embodiment, the ejector 13, the refrigerant distributor 14, and the throttle mechanism 18 are disposed in the separate tank 23. However, the refrigerant distributor 14 and the throttle mechanism 18 may be disposed in the upper tank 16b of the second evaporator 16. In this case, in order to allow the refrigerant flowing from the downstream side opening of the second pipe-shaped portion 14b into the right space 32 of the upper tank 15b of the first evaporator 15, it is necessary to provide a communication passage for communicating the right space 28 of the upper tank 16 of the second evaporator 16 with the right space 32 of the upper tank 15b of the first evaporator 15.

(2) The ejector 13, the refrigerant distributor 14, and the throttle mechanism 18 may be disposed in the upper tank 15b of the first evaporator 15. In this case, in order to allow the refrigerant flowing from the downstream side opening of the first pipe-shaped portion 14a into the upper space 28 of the upper tank 16b of the second evaporator 16, it is necessary to provide a communication passage for communicating the right space 32 of the upper tank 15b of the first evaporator 15 with the right space 28 of the upper tank 16b of the second evaporator 16.

Furthermore, a refrigerant passage for drawing the refrigerant entering the left space 27 of the right rank 16b of the second evaporator 16 into the refrigerant suction port 13b of the ejector 13 is required to be provided between the left space 27 of the upper tank 16b of the second evaporator 16 and the refrigerant suction port 13b of the ejector 13.

(3) Alternatively, the ejector 13, the refrigerant distributor 14, and the throttle mechanism 18 may be disposed outside the first and second evaporators 15 and 16. In this case, respective refrigerant side outlets of the ejector 13, the refrigerant distributor 14, and the throttle mechanism 18 need to be connected to the first and second evaporators 15 and 16 via piping.

(4) In the first embodiment, when respective components of the integrated unit 20 are integrally assembled together, the first evaporator 15 and the second evaporator 16 are integrally brazed to each other. These components can be integrally assembled by various fixing means other than brazing, including screwing, caulking, welding, adhesive, and the like.

In the present embodiment, the fixing means of the ejector 13 is, for example, screwing. Any fixing means other than screwing that may not cause thermal deformation can be used. Specifically, the fixing means, such as caulking or adhesive, may be used to fix the ejector 13.

(5) Each of the above-mentioned embodiments describes a vapor-compression subcritical cycle using refrigerant whose high-pressure side pressure does not exceed a critical pressure thereof, such as flon-based or HC-based refrigerant. The invention may be applied to a vapor-compression supercritical cycle that uses refrigerant whose high-pressure side pressure exceeds the critical pressure, such as carbon dioxide ($CO_2$).

(6) Although in each of the above-mentioned embodiments, a fixed ejector including the nozzle portion 13a having a constant passage area is used as the ejector 13, the present invention is not limited thereto. A variable ejector including a variable nozzle portion having an adjustable passage area may be used as the ejector 13.

Specifically, the variable nozzle portion may be a mechanism, for example, in which a needle is inserted into a passage of the variable nozzle portion and the position of the needle is controlled by an electric actuator to adjust the passage area.

(7) In the first embodiment and the like, the present invention is applied to the refrigeration cycle for cooling the inside of the vehicle compartment or the inside of the freezer and refrigerator. Alternatively, both the first evaporator 15 having a refrigerant evaporation temperature positioned on the high-temperature side and the second evaporator 16 having a refrigerant evaporation temperature on the low-temperature side may be used for cooling different areas in the vehicle compartment (for example, an area on a front seat side in the vehicle compartment, and an area on a back seat side in the vehicle compartment).

Both the first evaporator 15 having the refrigerant evaporation temperature on the high-temperature side and the second evaporator 16 having the refrigerant evaporation temperature on the low-temperature side may be used for cooling the inside of the freezer and refrigerator. That is, a refrigeration chamber of the freezer and refrigerator may be cooled by the first evaporator 15 having the refrigerant evaporation temperature on the high-temperature side, and a freezing chamber of the freezer and refrigerator may be cooled by the second evaporator 16 having the refrigerant evaporation temperature on the low-temperature side.

(8) Although in each of the above-mentioned embodiments, the refrigeration cycle for a vehicle has been described, it is apparent that the present invention is not limited thereto. The invention can also be applied to a fixed refrigeration cycle or the like in the same way. For example, the present invention can be applied to, for example, an industrial refrigerator, a household refrigerator, a cooler for an automatic dispenser, a showcase with a refrigeration function, and the like.

The invention claimed is:

1. A unit for an ejector-type refrigeration cycle, the unit comprising:

an ejector that includes a nozzle portion configured to decompress and expand refrigerant, and a refrigerant suction port from which refrigerant is drawn by a high-velocity refrigerant flow jetted from the nozzle portion, the ejector being configured to mix the refrigerant injected from the nozzle portion with the refrigerant drawn from the refrigerant suction port so as to discharge the mixed refrigerant from an outlet of the ejector;

a first evaporator and a second evaporator configured as an integrated structure, and connected in parallel to a downstream side of the outlet of the ejector in a refrigerant flow, and configured to evaporate the refrigerant discharged from the outlet of the ejector wherein each of the first and the second evaporator includes a heat exchange core having a plurality of refrigerant tubes in which refrigerant flows to perform heat-exchange with air passing therethrough, and an upper tank having a distribution space that distributes refrigerant to the plurality of refrigerant tubes and a collection space that collects refrigerant from the plurality of refrigerant tubes, the upper tank of the first evaporator being adjacent the upper tank of the second evaporator; and a separated tank located between the adjacent upper tanks of the first and the second evaporators and extending in a longitudinal direction of the adjacent upper tanks that accommodates therein the ejector that includes a refrigerant inlet for introducing refrigerant, and a first, a second and a third through hole penetrating a side wall of the separated tank, wherein a downstream side of the first evaporator in a refrigerant flow is configured to be coupled to a refrigerant suction side of a compressor, a downstream side of the second evaporator is configured to be coupled to the refrigerant suction port of the ejector, the separated tank communicates with the distribution space of the upper tank of the second evaporator via the first through hole, communicates with the distribution space of the upper tank of the first evaporator via the second through hole, and communicates with the collection space of the upper tank of the second evaporator via the third through hole serving as the suction port.

2. The unit for ejector-type refrigerant cycle according to claim 1, wherein the first through hole is downstream of the second through hole.

3. A refrigeration cycle device comprising:
the compressor configured to draw and compress refrigerant;
a radiator configured to radiate heat from high-pressure refrigerant discharged from the compressor; and
the unit for the ejector-type refrigeration cycle according to claim 1, the unit being configured to decompress and evaporate the refrigerant supplied from the radiator.

4. The unit for the ejector-type refrigeration cycle according to claim 1, further comprising an accumulator disposed directly between the first evaporator and the refrigerant suction side of the compressor.

5. The unit for the ejector-type refrigeration cycle according to claim 1, wherein the second evaporator is attached directly to the first evaporator.

6. The unit for the ejector-type refrigeration cycle according to claim 1, wherein the integrated structure of the first and second evaporators allow at least one component of the first and second evaporators to be shared.

7. A unit for an ejector-type refrigeration cycle, the unit comprising:
an ejector that includes a nozzle portion decompressing and expanding refrigerant, a refrigerant suction port, the ejector mixing the refrigerant from the nozzle portion with refrigerant drawn by the refrigerant suction port to discharge the mixed refrigerant from an outlet of the ejector;
an integrated first and second evaporator connected in parallel to the outlet of the ejector, the first and second evaporators evaporating the refrigerant discharged from the outlet of the ejector;
a first upper tank on the first evaporator;
a second upper tank on the second evaporator;
a separated tank disposed between the first and second upper tanks, the separated tank being attached directly to the first and second upper tanks, the separated tank extending in a longitudinal direction of the first and second upper tanks, the ejector being disposed within the separated tank;
a refrigerant distributor disposed between the first and second upper tanks, the refrigerant distributor being directly attached to one of the separated tank and the ejector and extending in the longitudinal direction of the first and second upper tanks; and
a throttle mechanism disposed between the first and second upper tanks, the throttle mechanism being directly attached to the refrigerant distributor and extending in the longitudinal direction of the first and second upper tanks.

8. The unit for the ejector-type refrigeration cycle according to claim 7, wherein
the separated tank defines a first, a second and a third through hole penetrating a side wall of the separated tank;
the separated tank communicates with a distribution space defined by the second upper tank via the first through hole;
the separated tank communicates with a distribution space of the first upper tank via the second through hole; and
the separated tank communicates with a collection space of the second upper tank via the third through hole.

9. The unit for the ejector-type refrigeration cycle according to claim 8, wherein the third through hole serves as the refrigerant suction port of the ejector.

* * * * *